(12) United States Patent
Ahn et al.

(10) Patent No.: US 8,029,936 B2
(45) Date of Patent: Oct. 4, 2011

(54) HEATER FOR FUEL CELL SYSTEM

(75) Inventors: Jin Goo Ahn, Yongin (KR); Ju Yong Kim, Seoul (KR); Sung Chul Lee, Yongin (KR); Chan Ho Lee, Yongin (KR); Yong Kul Lee, Yongin (KR); Leonid Gorobinskiy, Yongin (KR); Man Seok Han, Yongin (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 1160 days.

(21) Appl. No.: 11/755,914

(22) Filed: May 31, 2007

(65) Prior Publication Data

US 2008/0044700 A1 Feb. 21, 2008

(30) Foreign Application Priority Data

Aug. 16, 2006 (KR) .................. 10-2006-0077219

(51) Int. Cl.
 *H01M 8/06* (2006.01)
 *H01M 8/04* (2006.01)
 *H01M 2/38* (2006.01)

(52) U.S. Cl. ........ 429/423; 429/416; 429/441; 429/442; 429/454; 422/198

(58) Field of Classification Search .......... 429/416, 429/423, 441, 442, 454; 422/190, 195, 198
See application file for complete search history.

(56) References Cited

U.S. PATENT DOCUMENTS

| | | | | |
|---|---|---|---|---|
| 3,970,816 A * | 7/1976 | Hosokawa et al. | ........... | 219/205 |
| 6,077,620 A * | 6/2000 | Pettit | .............................. | 429/425 |
| 7,037,349 B2 * | 5/2006 | Dauer et al. | ................ | 48/214 A |
| 2006/0112637 A1 * | 6/2006 | An et al. | ........................... | 48/61 |
| 2006/0154123 A1 * | 7/2006 | Kim et al. | ........................ | 429/20 |
| 2006/0156627 A1 * | 7/2006 | Brantley et al. | .................... | 48/61 |
| 2006/0246387 A1 * | 11/2006 | Smirnov | ....................... | 431/181 |
| 2006/0292410 A1 * | 12/2006 | Kaupert et al. | ................. | 429/20 |
| 2008/0141675 A1 * | 6/2008 | Liu et al. | ......................... | 60/777 |

FOREIGN PATENT DOCUMENTS

| | | |
|---|---|---|
| JP | 61-88460 | 5/1986 |
| JP | 02-170367 | 7/1990 |
| KR | 10-0314829 | 11/2001 |
| KR | 2004-34026 | 4/2004 |
| KR | 2005-87254 | 8/2005 |
| KR | 2006-81728 | 7/2006 |
| WO | WO 2006039909 A1 * | 4/2006 |

* cited by examiner

*Primary Examiner* — Barbara Gilliam
*Assistant Examiner* — Edu E. Enin-Okut
(74) *Attorney, Agent, or Firm* — Knobbe, Martens, Olson & Bear LLP

(57) ABSTRACT

A heater for heating a reformer of a fuel cell system includes a combustion chamber having a combustion catalyst layer; a distributor having an inner space and uniformly distributing a combustion fuel and an oxidant flowing along the inner space to the combustion catalyst layer of the combustion chamber; and an igniter igniting the combustion fuel and the oxidant, wherein the igniter is placed in the inner space of the distributor. Thus, the igniter is protected from combustion heat of the combustion catalyst layer and thus has improved durability.

14 Claims, 3 Drawing Sheets

HEATER FOR FUEL CELL SYSTEM

CROSS-REFERENCE TO RELATED APPLICATIONS

This application claims the benefit of Korean Application No. 2006-77219, filed on Aug. 16, 2006, in the Korean Intellectual Property Office, the disclosure of which is incorporated herein by reference.

BACKGROUND OF THE INVENTION

1. Field of the Invention

Aspects of the present invention relate to a heater for heating a reformer of a fuel cell, and more particularly, to a heater for a fuel cell system, in which an igniter is provided inside a distributor that distributes a combustion fuel and an oxidant to a combustion catalyst layer in the case where a combustion catalyst is used in burning the combustion fuel, so that durability of the igniter is enhanced.

2. Description of the Related Art

In general, a fuel cell system is a power generation system that generates electricity through an electrochemical reaction between hydrogen and an oxidant. As an example of a fuel cell system, a polymer electrolyte membrane fuel cell (PEMFC) employs hydrogen produced by reforming a hydrogen-containing fuel. A PEMFC thus has advantages as compared with other types of fuel cells in that its output performance is excellent; its operation temperature is low; and its start and response are quickly performed. Further, the PEMFC can be used for a wide variety of purposes such as, for example, as a distributed power source for a house or a public building, as a small portable power source for portable electronic devices, etc., and as a transportable power source for vehicles.

A typical PEMFC system includes a fuel container to store hydrogen-containing fuel; a reformer to reform the hydrogen-containing fuel supplied from the fuel container and to produce hydrogen; and a fuel cell main body (hereinafter, referred to as a 'stack') to generate the electricity through an electrochemical reaction between hydrogen supplied from the reformer and oxygen.

As shown in FIG. 5, a reformer disclosed in Korean First Patent Publication No. 2004-0034026 comprises a preheater 10 to preheat water supplied from the outside; a mixing preheater 20 in which water preheated by the preheater 10 and hydrocarbonaceous gas supplied from the outside are mixed and preheated; a steam-reforming reaction unit 30 in which reaction gas preheated by the mixing preheater 20 absorbs heat and causes a steam-reforming reaction to produce hydrogen; and a burner 40 to provide heat for the endothermic reaction of the steam-reforming reaction unit 30. In the reformer, the preheater 10, the mixing preheater 20, the steam-reforming reaction unit 30 are manufactured to have a planar dimension such that they can be stacked with one another within a heat isolating reformer body 50. Specifically, the preheater 10, the mixing preheater 20 and the steam reforming reaction unit 30 are stacked from a top to a bottom of the reformer body 50 in sequence. The burner 40 is placed under the steam-reforming reaction unit 30. Further, two gas guiding plates 60 and 70 are provided between the preheater 10 and the mixing preheater 20 and between the mixing preheater 20 and the steam-reforming reaction 30, respectively. Such two gas guiding plates 60 and 70 are used to maintain the combustion heat transferred from the burner 40 at a proper temperature for the reforming reaction and preheating.

Further, a reformer, disclosed in Korean First Patent Publication No. 1996-0034070, comprises single dual cylinder type tube reforming pipe filled with a reforming catalyst. In this reformer, the reforming pipe is internally provided with a plurality of combustion catalyst layers having a honey-comb structure; a fuel supplying pipe provided in the center of the combustion catalyst layer; and a fuel gasifying coil provided inside and connected to the reforming pipe.

As illustrated by the related examples above, a heater for heating a reformer can typically be classified as one of two types, a catalyst heater that burns a combustion fuel by the catalysis of the combustion catalyst, and a combustion heater (i.e., burner) that burns the combustion fuel by flames.

A catalyst heater typically comprises a combustion catalyst layer; a distributor to uniformly distribute the combustion fuel and oxidant to the combustion catalyst layer; and an igniter to ignite the combustion fuel and air.

In the catalyst heater, heat generated when the combustion fuel and oxygen are ignited by the igniter is used in heating the combustion catalyst layer to its catalyst activity temperature. After the combustion catalyst layer is heated up to its catalyst activity temperature, the igniter stops operating. After the igniter stops operating, combustion of the combustion fuel and oxygen continues due to the catalytic activity of the heated combustion catalyst layer.

After the operation of the igniter is stopped, the igniter continues to be exposed to oxygen and continues to be heated by the heat generated by the catalytic combustion. Accordingly, the igniter is vulnerable to high temperature oxidation due to prolonged exposure to heat and oxygen, which reduces its durability.

SUMMARY OF THE INVENTION

Accordingly, aspects of the present invention provide a heater for a fuel cell system, in which an igniter igniting combustion fuel and oxygen is prevented from exposure to heat generated while the combustion fuel and oxygen are burnt in combustion catalyst layer, so that the durability of the igniter is enhanced.

According to an aspect of the present invention, there is provided a heater for a fuel cell system, comprising: a combustion chamber having a combustion catalyst layer; a distributor having an inner space and distributing a combustion fuel and an oxidant flowing from the inner space to the combustion catalyst layer of the combustion chamber; and an igniter that ignites the combustion fuel and the oxidant, wherein the igniter is located in the inner space of the distributor.

According to an aspect of the invention, the igniter comprises an electric resistance body that includes a heating wire made of NICHROME (a commercial nickel-chromium alloy).

According to an aspect of the invention, the distributor comprises a housing that is formed with an introducing opening through which the combustion fuel and the oxidant are introduced and at least one discharging hole through which the combustion fuel and the oxidant are discharged. Further, the electric resistance body is provided in the inner space through the introducing opening.

According to an aspect of the invention, the heater further comprising a holder provided in the introducing opening of the distributor and holding two ends of the igniter. The holder comprises through holes through which two ends of the igniter pass and extend to an outside.

According to an aspect of the invention, the holder comprises a communicating hole through which the combustion fuel and the oxidant flow. Further, the heater further comprises a guiding pipe provided in the communicating hole and guiding the combustion fuel and the oxidant to the inner space of the distributor.

According to an aspect of the invention, the electric resistance body has an external surface coated with a coating material resistant to high temperature and oxidation, wherein the coating material on the external surface has a thickness of 0.5~2 mm and is made of a ceramic material.

According to another aspect of the invention, there is provided a fuel reforming unit; and a heater that supplies heat to the fuel reforming unit, wherein the heater is the heater described above.

According to another aspect of the invention, there is provided a fuel cell system comprising: a fuel feeder; a fuel reformer; and a fuel cell stack; wherein the fuel reformer comprises a fuel reforming unit; and a heater that supplies heat to the fuel reforming unit, wherein the heater is the heater described above.

According to another aspect of the invention, there is provided a method of heating a reformer of a fuel cell system, comprising: providing a combustion fuel and an oxidant to a heater for a fuel cell system, the heater comprising: a combustion chamber having a combustion catalyst layer; a distributor having an inner space and a plurality of discharging holes through which a combustion fuel and oxidant are distributed from the inner space to the combustion catalyst layer; and an igniter that ignites the combustion fuel and the oxidant, wherein the igniter is located in the inner space of the distributor; operating the igniter to combust the combustion fuel and oxidant to heat the combustion catalyst layer to a catalyst activity temperature, and stopping the operating of the igniter when the combustion catalyst layer reaches catalyst activity temperature, such that the combustion fuel and the oxidant continue to be combusted in the combustion catalyst layer and such that the igniter is protected from damage from combustion heat generated in the combustion catalyst layer by being located in the inner space of the distributor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
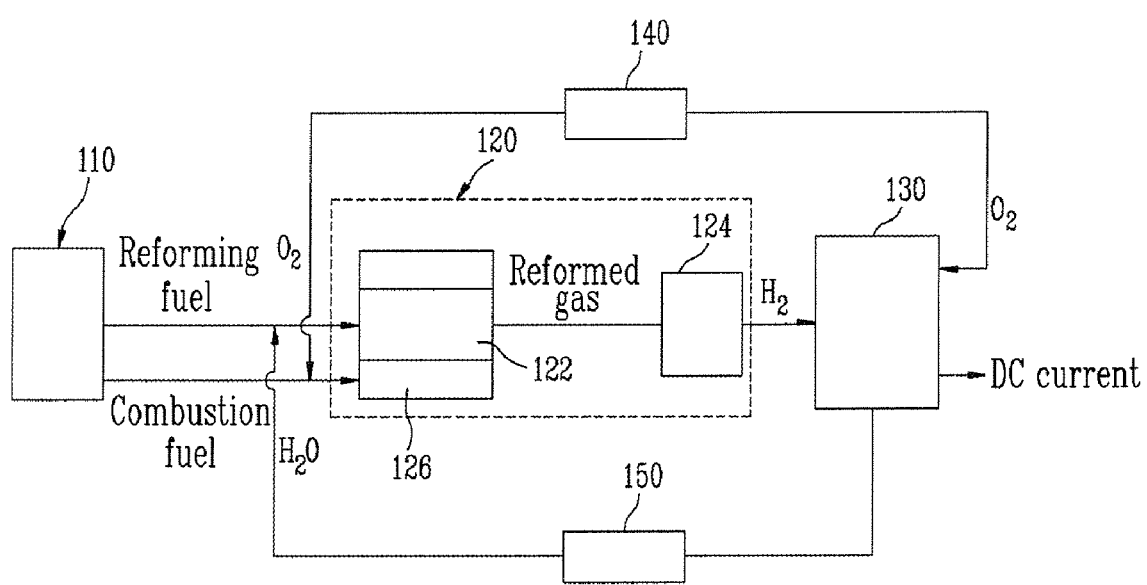
FIG. 1 is a schematic view of a polymer electrolyte membrane fuel cell (PEMFC) employing a heater according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Referring to FIG. 1, a polymer electrolyte membrane fuel cell comprises a fuel feeder 110 to store hydrogen-containing fuel; a reformer 120 to produce hydrogen by reforming the hydrogen-containing fuel supplied from the fuel feeder 110; and a stack 130 to generate electricity through an electrochemical reaction between hydrogen supplied from the reformer 120 and an oxidant. A recovering tank 150 recovers and recycles water produced by the electrochemical reaction in the stack 130.

The oxidant supplied to the stack 130 may be pure oxygen stored in a separate storage or may be oxygen-containing air. For example, the oxidant may be supplied from an air feeder 140 to the stack 130. Further, the hydrogen-containing fuel may include an alcoholic fuel such as methanol, ethanol, etc.; a hydrocarbonaceous fuel such as methane, propane, butane, etc.; or natural gas such as liquefied natural gas, etc., but the hydrogen-containing fuel is not limited to these examples.

Some of the hydrogen-containing fuel stored in the fuel feeder 110 is introduced as reforming fuel into a reforming reaction unit 122 of the reformer 120. Another portion of the hydrogen-containing fuel may be introduced as combustion fuel into a heater 126 of the reformer 120.

The reformer 120 comprises a reforming reaction unit 122 that produces reformed gas that mainly contains hydrogen by reforming a reforming fuel supplied from the fuel feeder 110; a CO remover 124 that is connected to and communicates with the reforming reaction unit 122 and removes carbon monoxide (CO) from the reformed gas; and the heater 126 that supplies heat energy to the reforming reaction unit 122 and the CO remover 124.

The reforming reaction unit 122 is provided with a reforming catalyst (not shown). The reforming reaction unit 122 reforms the hydrogen-containing fuel by a reforming method such as steam reforming (SR), auto thermal reforming (ATR), a partial oxidation (POX) method, etc., but the reforming method is not limited thereto. The partial oxidation method and the auto thermal reforming method have good characteristics in responding to initial start and load variations, but the steam reforming method has good efficiency in producing hydrogen.

The steam reforming method produces a reformed gas mainly containing hydrogen by a chemical reaction, i.e., an endothermic reaction between the hydrogen-containing fuel and steam on a catalyst. The steam reforming method has been most widely used because the reformed gas is stably supplied and relative high concentration of hydrogen is obtained, even though this method requires much energy to perform the endothermic reaction.

For example, in the case where the reforming reaction unit 122 employs the stream reforming method, a steam reforming reaction between the reforming fuel, i.e., some of the hydrogen-containing fuel supplied from the fuel feeder 110, and water supplied from the recovering tank 150 is performed on the reforming catalyst, thereby producing a reformed gas that is rich in hydrogen.

The reforming reaction unit 122 can include a carrier supported with metal such as, for example, ruthenium, rhodium, nickel, etc. The carrier can include a carrier material such as, for example, zirconium dioxide, alumina, silica gel, active alumina, titanium dioxide, zeolite, active carbon, etc.

The reformed gas produced in the reforming reaction unit 122 by the steam reforming reaction may include small amounts of carbon dioxide, methane and/or carbon monoxide. Of these, carbon monoxide is particularly undesirable because it can poison platinum catalysts that are typically used in electrodes of the stack 130. Carbon monoxide thus deteriorates the performance of the fuel cell system, and should be removed.

To remove carbon monoxide, the CO remover 124 is provided ahead of the stack 130 and includes a water gas shift unit (not shown) in which a water gas shift reaction is performed, and a preferential oxidation unit (not shown) in which a preferential oxidation catalyst reaction is performed. The water gas shift unit is provided with a shift catalyst (not shown), and the preferential oxidation unit is provided with an oxidation catalyst (not shown). The preferential oxidation unit receives an oxidant needed for the preferential oxidation reaction from the air feeder 140.

Further, the reformer 120 comprises the heater 126 to generate heat energy by burning another portion of the hydrogen-containing fuel (i.e., the combustion fuel) supplied from the fuel feeder 110. The heater 126 receives the oxidant from the air feeder 140 as well as the combustion fuel from the fuel feeder 110. The heat energy generated by the heater 126 is supplied to the reforming reaction unit 122 and the CO remover 124, so that the reforming reaction unit 122 and the CO remover 124 are heated up to a catalyst activity temperature.

Figure 2:
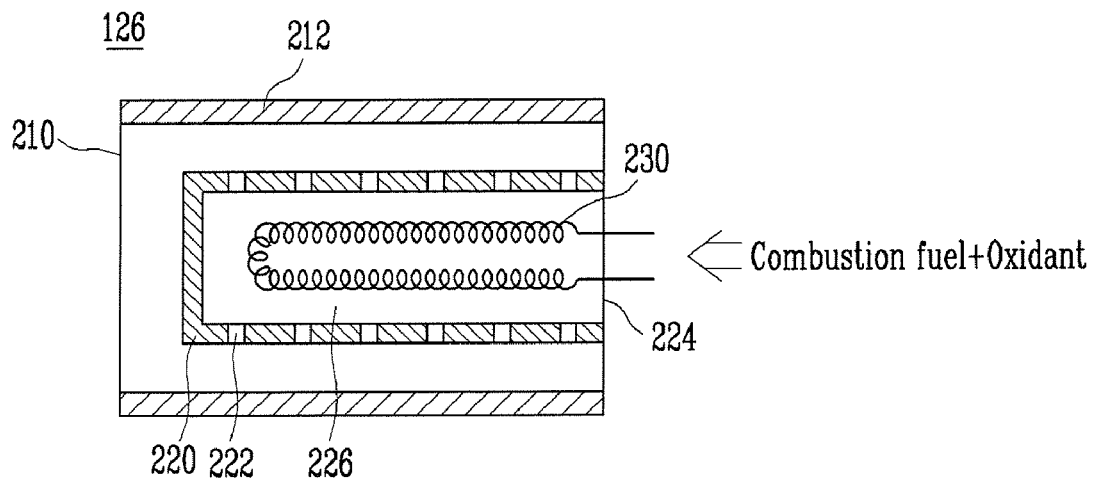
FIG. 2 is a sectional view of the heater according to FIG. 1.

According to the embodiment of FIG. 2, the heater 126 comprises a combustion chamber 210 having a combustion catalyst layer 212; a distributor 220 to uniformly distribute the combustion fuel and the oxidant to the combustion catalyst layer 212 of the combustion chamber 210; and an igniter 230 to initially ignite the combustion fuel and the oxidant. As a non-limiting example, the combustion catalyst layer 212 may have a structure in which a catalyst such as platinum, palladium or the like is supported on an alumina carrier.

The distributor 220 comprises a housing formed with an introducing opening 224 into which the combustion fuel and the oxidant are introduced, and a plurality of discharging holes 222 through which the combustion fuel and the oxidant introduced through the introducing opening 224 are discharged. The housing of the distributor 220 can have any suitable shape such as, for example, a cylindrical or rectangular shape, but the shape is not limited thereto. In the housing of the distributor 220, an inner space 226 is provided between the introducing opening 224 and the discharging holes 222, so that the combustion fuel and the oxidant can flow in the inner space 226. Accordingly, in the distributor 220, the combustion fuel and the oxidant are introduced into the inner space 226 through the introducing opening, and then discharged to the combustion catalyst layer 212 of the combustion chamber 210 through the discharging holes 222.

The igniter 230 is inserted in the inner space 226 through the introducing opening of the distributor 220. The igniter 230 can comprise an electric resistance body such as a heating wire that can generate electric heat, but not limited thereto. Preferably, the heating wire includes a nickel-chromium alloy such as, for example, NICHROME. Two ends of the igniter 230 are extended to the outside via the introducing opening 224 and are electrically connected to a power source (not shown). Accordingly, when the power source supplies electricity to the igniter 230, the igniter 230 generates resistance heat, thereby burning the combustion fuel and the oxidant introduced into the inner space 226 through the introducing opening 224 of the distributor 220.

Figure 3:
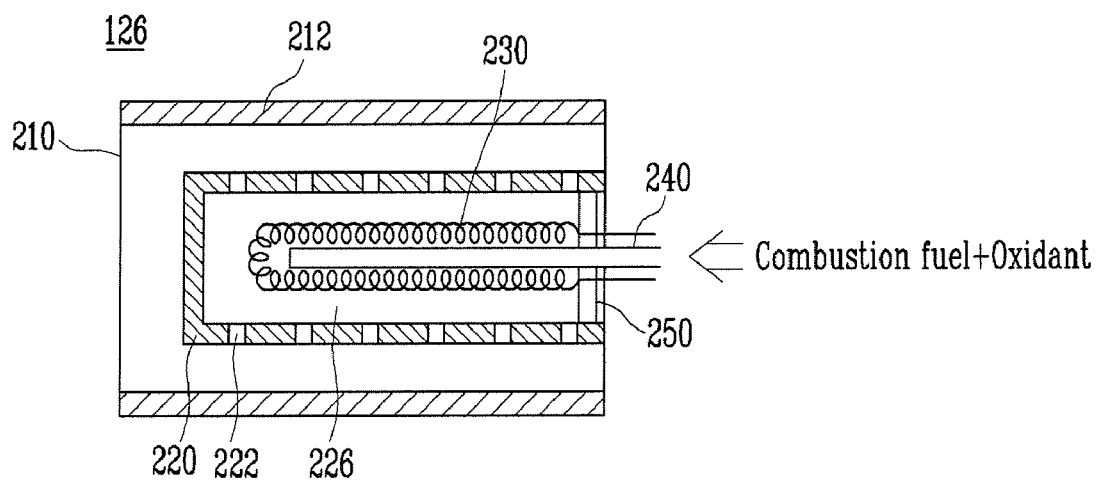
FIG. 3 is a sectional view of a heater according to another embodiment of the present invention.
Figure 4:
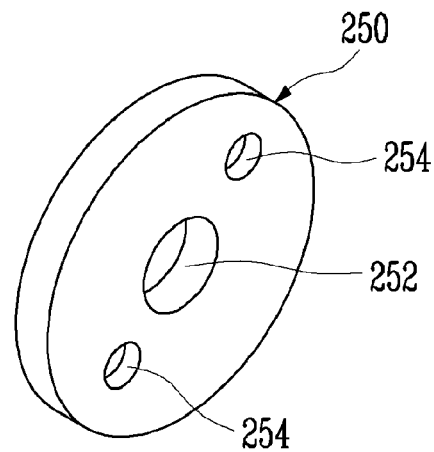
FIG. 4 is a perspective view of a holder provided in an introducing opening of a distributor according to an embodiment of the present invention.
Figure 5:
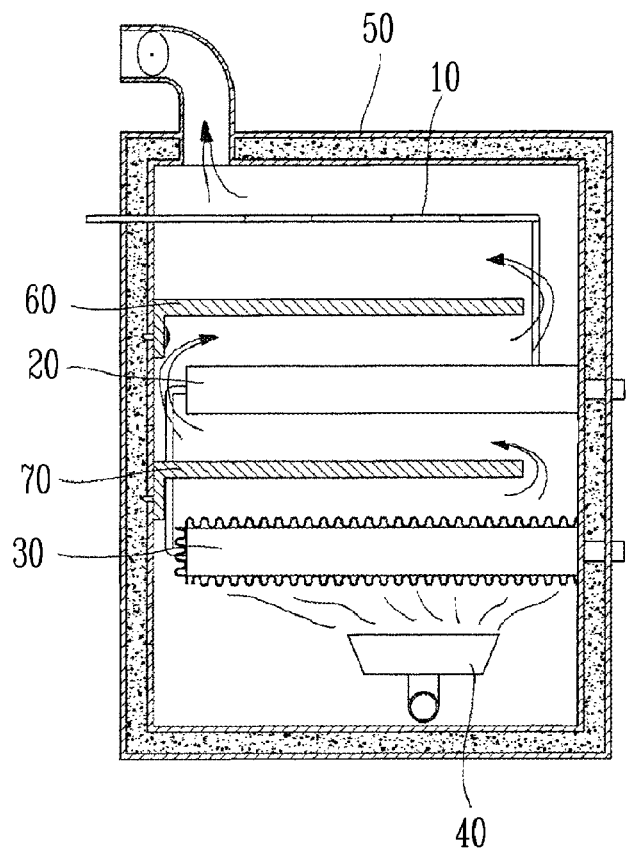
FIG. 5 is a sectional view of a related art reformer.

According to the embodiment shown in FIGS. 3 and 4, a holder 250 is provided in an introducing end of the distributor 230 and holds both ends of the igniter 230. The holder 250 is formed with through holes 254 through which both ends of the igniter 230 can pass. Further, the holder 250 is formed with a communicating hole 252, which, as an example, can be at an approximate center thereof, through which the combustion fuel and the oxidant can flow. As a non-limiting example, a guiding pipe 240 can penetrate the communicating hole 252 and guide the combustion fuel and the oxidant to flow therethrough. Accordingly, the igniter 230 is positioned in the inner space 226 of the distributor 230 such that both ends thereof are extended and electrically connected to the power source via the through holes 254 of the holder 250. When the power source supplies electricity to the igniter 230 while the combustion fuel and the oxidant are introduced into the inner space 226 of the distributor 230 through the communicating hole 252, and/or through the guiding pipe 240 penetrating the communicating hole 252, the combustion fuel and the oxidant are burnt by the resistance heat of the igniter 230.

As described above, the combustion heat generated when the combustion fuel and the oxidant are burnt by the resistance heat of the igniter 230 is transferred to the combustion chamber 210 through the distributor 220 itself, and particularly, through the discharging holes 222 of the distributor 220, thereby heating the combustion catalyst layer 212. Then, when the combustion catalyst layer 212 is heated up to the catalyst activity temperature, the power source stops supplying electricity to the igniter 230, thereby stopping the operation of the igniter 230.

Thereafter, the combustion fuel and the oxidant introduced into the inner space 226 of the distributor 220 through the introducing end of the distributor 220, the communicating hole 252 of the holder 250 or the guiding pipe 240 are discharged to the combustion chamber 210 through the discharging holes 222 of the distributor 220, since the combustion fuel and the oxidant are no longer being burned by the igniter 230. Then, the combustion fuel and the oxidant discharged to the combustion chamber 210 are burnt by the catalysis of the combustion catalyst layer 212, which has been heated to the catalyst activity temperature. Thereafter, the combustion heat generated while the combustion fuel and the oxidant are burnt in the combustion chamber 210 is transferred to the reforming reaction unit 122 of the reformer 120.

Meanwhile, the distributor 220 has a heat insulating effect to protect the igniter 230 from the combustion heat generated while the combustion fuel and the oxidant are burnt in the combustion chamber 210. In other words, the inner space 226 of the distributor 220 is prevented from being maintained in a high temperature atmosphere. Further, the combustion fuel and the oxidant are introduced from the outside into the inner space 226 of the distributor 220 while having a relatively low temperature, so that the temperature of the inner space 226 can be maintained in a relatively low temperature, thereby preventing the igniter 230 from being heated by the combustion heat in the combustion chamber 210.

To more effectively protect the igniter 230 from the combustion heat in the combustion chamber 210, an external surface of the igniter 230 may be coated with a heat resistant material, and particularly with a material resistant to high temperature and oxidation, having a predetermined thickness.

For example, the material resistant to the high temperature and the oxidation may include a ceramic material and may be coated on the external surface of the igniter 230 at a thickness of about 0.5~2 mm to.

According to aspects of the present invention, in the heater that heats the reformer of a fuel cell, the igniter for igniting the combustion fuel and the oxidant is provided in the inner space of a distributor that distributes the combustion fuel and the oxidant to the combustion catalyst layer, so that the igniter is protected from the heat generated by the combustion catalyst layer, thereby enhancing the durability of the igniter.

Although a few embodiments of the present invention have been shown and described, it would be appreciated by those skilled in the art that changes might be made in this embodiment without departing from the principles and spirit of the invention, the scope of which is defined in the claims and their equivalents.

What is claimed is:

1. A heater for a fuel cell system, comprising:
a combustion chamber having a combustion catalyst layer;
a distributor having an inner space and being configured to distribute a combustion fuel and an oxidant flowing from the inner space to the combustion catalyst layer of the combustion chamber, wherein the distributor comprises a housing formed with an introducing opening through which the combustion fuel and the oxidant are introduced, and at least one discharging hole through which the combustion fuel and the oxidant are discharged;
an igniter that ignites the combustion fuel and the oxidant, wherein the igniter is located in the inner space of the distributor; and
a holder provided in the introducing opening of the distributor and holding two ends of the igniter, wherein the holder comprises a communicating hole through which the combustion fuel and the oxidant flow into the inner space of the distributor.

2. The heater of claim 1, wherein the igniter comprises an electric resistance body.

3. The heater of claim 2, wherein the electric resistance body comprises a heating wire.

4. The heater of claim 3, wherein the heating wire comprises an alloy comprising nickel and chromium.

5. The heater of claim 1, wherein the distributor includes a plurality of discharging holes through which the combustion fuel and oxidant are uniformly distributed to the combustion catalyst layer.

6. The heater of claim 1, wherein the igniter is provided in the inner space by way of the introducing opening.

7. The heater of claim 1, wherein the holder comprises through holes through which two ends of the igniter pass and extend to an outside.

8. The heater of claim 1 further comprising a guiding pipe provided in the communicating hole and guiding the combustion fuel and the oxidant to the inner space of the distributor.

9. The heater of claim 2, wherein the electric resistance body has an external surface coated with a coating material resistant to high temperature and oxidation.

10. The heater of claim 9, wherein the coating material on the external surface of the electric resistance body has a thickness of between about 0.5 to about 2 mm.

11. The heater of claim 9, wherein the coating material comprises a ceramic material.

12. A fuel reformer for a fuel cell system comprising:
a fuel reforming unit; and
the heater of claim 1,
wherein the heater is configured to supply heat to the fuel reforming unit.

13. A fuel cell system comprising:
a fuel feeder;
a fuel reformer; and
a fuel cell stack;
wherein the fuel reformer comprises a fuel reforming unit and the heater of claim 1, and
wherein the heater is configured to supply heat to the fuel reforming unit.

14. The fuel cell system of claim 13, wherein the fuel feeder is configured to supply a hydrogen-containing fuel to the fuel reforming unit and the heater, and wherein the fuel cell system further includes an air feeder configured to supply oxygen or air to the heater and to the fuel cell stack.

* * * * *

UNITED STATES PATENT AND TRADEMARK OFFICE
CERTIFICATE OF CORRECTION

| | |
|---|---|
| PATENT NO. | : 8,029,936 B2 |
| APPLICATION NO. | : 11/755914 |
| DATED | : October 4, 2011 |
| INVENTOR(S) | : Ahn et al. |

It is certified that error appears in the above-identified patent and that said Letters Patent is hereby corrected as shown below:

Column 2, Line 39, after "burnt in" insert --a--.

Column 6, Line 60, delete ""~2" and after "to" insert --about 2 mm--.

Signed and Sealed this
Fifteenth Day of May, 2012

David J. Kappos
*Director of the United States Patent and Trademark Office*